United States Patent
Grosch (10) Patent No.: US 11,072,269 B2
(45) Date of Patent: Jul. 27, 2021

(54) TAILGATE SUBASSEMBLY FOR A VEHICLE

(71) Applicant: FORD GLOBAL TECHNOLOGIES, LLC, Dearborn, MI (US)

(72) Inventor: Guenter Hans Grosch, Vettweiß (DE)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 16/269,279

(22) Filed: Feb. 6, 2019

(65) Prior Publication Data

US 2019/0241110 A1    Aug. 8, 2019

(30) Foreign Application Priority Data

Feb. 6, 2018   (DE) .......................... 102018201798.0

(51) Int. Cl.
  *B60N 3/02*   (2006.01)
  *B60J 5/10*   (2006.01)
  *E05B 1/00*   (2006.01)

(52) U.S. Cl.
  CPC .............. *B60N 3/023* (2013.01); *B60J 5/101* (2013.01); *E05B 1/0015* (2013.01); *E05B 2001/0023* (2013.01); *E05Y 2900/546* (2013.01)

(58) Field of Classification Search
  CPC .................... B60J 5/101; E05B 1/0015; E05B 2001/0023; E05B 85/12; E05Y 2900/546; B60N 3/023
  See application file for complete search history.

(56) References Cited

U.S. PATENT DOCUMENTS

| | | | | |
|---|---|---|---|---|
| 3,971,589 A | * | 7/1976 | Elrod ...................... | B66D 1/02 296/76 |
| 4,188,061 A | * | 2/1980 | Shehi ...................... | E05C 17/36 296/76 |
| 6,152,502 A | * | 11/2000 | Rossi ...................... | B60J 5/101 292/347 |
| 6,385,816 B1 | * | 5/2002 | Baidas .................. | B60N 3/023 16/4 |

(Continued)

FOREIGN PATENT DOCUMENTS

| DE | 10233781 A1 | 2/2004 |
|---|---|---|
| DE | 202014003662 U1 | 8/2015 |

(Continued)

OTHER PUBLICATIONS

English Machine Translation of DE10233781A1 dated Feb. 19, 2004.

(Continued)

*Primary Examiner* — Justin B Rephann
(74) *Attorney, Agent, or Firm* — David Coppiellie; King & Schickli, PLLC (57) ABSTRACT

A tailgate subassembly for a vehicle includes a tailgate and a flexible elongated pulling element. In an open position of the tailgate, the flexible elongated pulling element extends downwardly at least partially from a starting region on an inner face of the tailgate and on the end side comprises a grip portion for a user. In order to provide improved means for closing a tailgate of a vehicle, the elongated pulling element is coupled to a retraction device which is designed to pull up the grip portion in the direction of the starting region when the tailgate is moved into a closed position.

8 Claims, 5 Drawing Sheets

(56) References Cited

U.S. PATENT DOCUMENTS

| | | | | |
|---|---|---|---|---|
| 6,394,511 | B1* | 5/2002 | Lam | E05B 83/16 |
| | | | | 292/336.3 |
| 8,029,038 | B2* | 10/2011 | Woodhouse | B60Q 3/30 |
| | | | | 296/63 |
| 8,684,435 | B1* | 4/2014 | Lee | E05B 81/34 |
| | | | | 296/1.02 |
| 8,726,467 | B1* | 5/2014 | Smith | B65H 75/425 |
| | | | | 16/412 |
| 2001/0042995 | A1* | 11/2001 | Kim | B60J 5/107 |
| | | | | 296/146.8 |
| 2012/0151840 | A1* | 6/2012 | Scheier | E05B 83/18 |
| | | | | 49/358 |
| 2016/0312501 | A1* | 10/2016 | Lee | E05B 85/12 |
| 2018/0111455 | A1* | 4/2018 | Felix Frias | B60J 5/107 |
| 2018/0187462 | A1* | 7/2018 | Ayata | B60J 5/10 |
| 2018/0258679 | A1* | 9/2018 | Topolovec | E05F 11/54 |

FOREIGN PATENT DOCUMENTS

| | | | |
|---|---|---|---|
| EP | 1384843 | A2 | 1/2004 |
| FR | 2943582 | A1 | 10/2010 |

OTHER PUBLICATIONS

English Machine Translation of DE202014003662U1 dated Aug. 13, 2015.
English Machine Translation of EP1384843A2 dated Jan. 28, 2004.
English Machine Translation of FR2943582A1 dated Oct. 1, 2010.

* cited by examiner

TAILGATE SUBASSEMBLY FOR A VEHICLE

TECHNICAL FIELD

This document relates to a tailgate subassembly for a vehicle having the features of the following claims.

BACKGROUND

Motor vehicles, such as passenger motor vehicles, normally have a trunk and/or loading space which is closable by a tailgate which is pivotably connected to the vehicle structure. The pivot axis in this case typically extends in the transverse direction of the vehicle so that the tailgate is pivoted upwardly when opened. Depending on the arrangement of the pivot axis, the dimensioning of the tailgate and the opening angle, the end of the tailgate opposing the pivot axis (which could also be called the lower edge of the tailgate) may be located relatively far above the ground, for example more than 2 m. As a result, in particular for shorter users, it is difficult to grasp the tailgate in order to close this tailgate again. More specifically a grip is often provided on the inner face of the tailgate but this is also difficult to reach if it protrudes only slightly from the tailgate. In addition, it is also known, for example, to fasten a type of pulling cord or pulling strap to the tailgate, which hangs down from the inner face thereof and at a sufficient length may be easily reached by the user. However, there is the risk here that when closing the tailgate the pulling cord is inadvertently trapped between the tailgate and the vehicle body, whereby the end thereof is located outside the vehicle and may become soiled when the vehicle travels. The pulling cord could also be trapped inside the loading space by a shifting load so that when the tailgate is opened again, either parts of the load are entrained by the pulling cord or the pulling cord could even be torn off.

EP 1 384 843 A2 discloses a tailgate on a vehicle with a lock arranged on the flap and with a dirt-free grip which serves for actuating the flap and which is able to be switched via a grip drive between a protected resting position of the grip in the interior of the flap and an operating position, ready for actuation, protruding out of the flap. A single common drive is assigned to the lock drive, on the one hand, and to the grip drive, on the other hand, said single common drive being provided to switch both the grip drive and the lock drive.

Regarding the disclosed prior art, the known aids for closing a tailgate still leave further room for improvement.

SUMMARY

The object of this document is to provide improved means for closing a tailgate of a vehicle.

The object is achieved by a tailgate subassembly having the features of claim 1, wherein the dependent claims relate to an advantageous embodiment of the tailgate subassembly.

It should be mentioned that the features and measures set forth individually in the following description may be combined together in any technically expedient manner and disclose further embodiments. The description characterizes and specifies the tailgate subassembly, in particular, additionally in combination with the figures.

A tailgate subassembly for a vehicle is provided. The vehicle may, in particular, be a motor vehicle such as a passenger motor vehicle, van or truck, however it could also be a vehicle without a separate drive, such as for example a trailer. The tailgate subassembly comprises a tailgate. The tailgate normally serves to close a trunk and/or loading space in the rear region of the vehicle. In this case, in the mounted state the tailgate is pivotable about a pivot axis extending in the transverse direction (Y-direction) of the vehicle relative to a body of the vehicle. Within the scope of the description there are no limitations regarding any further design of the tailgate. Thus this tailgate (such as for example in the case of an SUV, minivan or other combi-vehicle) may have a rear window or may even have no rear window (such as for example in the case of a sedan). There are also no limitations regarding the shape so that the tailgate, for example, may be shaped in an approximately linear, curved and/or angled manner.

The tailgate subassembly further comprises a flexible elongated pulling element which in an open position of the tailgate extends downwardly at least partially from a starting region on an inner face of the tailgate and on the end side comprises a grip portion for a user. "Inner face" in this case refers to that side of the tailgate which is oriented toward the loading space and/or interior of the vehicle when the tailgate is closed. The pulling element is configured to be elongated and/or longitudinally extended, for example strap-like, strand-shaped or cord-shaped. The pulling element may comprise different portions having different cross sections and/or being made of different material. In any case, as a whole the pulling element is flexible or bendable. As regards bending, the pulling element may optionally be configured to be resilient which, however, is not necessary for the function. On the end side, the pulling element comprises a grip portion for the user. This grip portion may be part of the pulling element or part of a different element. The grip portion is provided and normally also configured, in particular, to be manually grasped by the user.

In an open position of the tailgate, the pulling element extends downwardly at least partially from a starting region which is arranged on an inner face of the tailgate. The open position in this case is generally a position in which the tailgate is not closed, in particular it may be the fully open position. The pulling element is provided such that the user manually grasps the grip portion arranged on the end side and may exert a pulling force on the tailgate by means of the pulling element, in order to close the tailgate. In this case, the pulling force is normally transmitted in the starting region or in the vicinity thereof to the tailgate. The pulling element may be secured at least partially to the tailgate in the starting region. The part of the pulling element which is arranged between the starting region and the grip portion is normally freely movable. This part extends downwardly and, for example, may hang downwardly in the direction of gravity, at least provided that the user has not grasped the grip portion. In this case, the length of the pulling element may be dimensioned such that the grip portion is at a comfortable grip height above the ground, even when the tailgate is fully open. As a result, even a shorter user is able to grasp the grip portion and is able to pull the tailgate down easily in order to close said tailgate.

Apart from the tailgate and the pulling element, for example, elements of the vehicle body adjoining the tailgate, hinge parts or other elements may optionally also form part of the tailgate subassembly.

The pulling element may be coupled to a retraction device which is designed to pull up the grip portion in the direction of the starting region when the tailgate is moved into a closed position. The term "retraction device" refers to the fact that pulling up the grip portion in the direction of the starting region in many cases may be described as retracting the pulling element. The tailgate subassembly, however, is not limited thereto and the term "retraction device" in this regard is not to be interpreted as limiting. In any case, the pulling up of the grip portion ensures that this grip portion is located closer to the inner face of the tailgate and is at least more effectively secured. The risk that the grip portion or parts of the pulling element, for example, may be trapped by a shifting load is reduced. The same applies to the risk that the pulling element and/or the grip portion are trapped between the tailgate and the vehicle body when the tailgate is closed. In some embodiments which are discussed in more detail below, this risk may also be completely avoided. In this case, the retraction device is designed such that when the tailgate is closed, the grip portion is pulled up by the retraction device. The pulling-up action may be coupled in a causal manner to the closing of the tailgate. In other words, whenever the user closes the tailgate, whether with or without the use of the pulling element, the grip portion as described above is pulled up by the retraction device in the direction of the starting region. It could also be said that the pulling-up action is carried out automatically when the tailgate is closed.

Preferably, the retraction device is designed to retract the pulling element at least partially into an interior of the tailgate. The interior of the tailgate in this case is denoted as a region which is arranged between the outer face of the tailgate, which faces the surroundings of the vehicle, and the inner face of the tailgate, which faces the interior of the vehicle (the driver's cab, the trunk, or the like). In this embodiment, an intermediate space which is generally otherwise present between the inner face and the outer face is used in order to accommodate at least parts of the pulling element. This solution is firstly visually attractive and secondly, for example, damage to the pulling element may be prevented more effectively. In this case, an opening is configured on the inner face of the tailgate, the pulling element being guided outwardly through this opening from the interior.

Within the scope of the invention, it is possible that the user himself, for example when opening the tailgate, has to move the grip portion into a position which is advantageous for the user, i.e. to a certain extent has to pull out the grip portion. Within the context of a use which is as simple as possible, it is preferred if the retraction device is designed to extend the grip portion relative to the starting region when the tailgate is moved into the open position. In other words, to a certain extent a reverse movement to the pulling-up of the grip portion when the tailgate is closed takes place at this point. Normally, the pulling element hangs down with the grip region on the end side from the starting region so that it could also be said that the grip portion is lowered relative to the starting region. In this embodiment it is ensured that to a certain extent the grip region is automatically located in an advantageous position for the user when the tailgate is opened. The retraction device may be designed to lower the grip portion to a suitable height above the ground, for example at most 1.80 m or at most 1.60 m, whereby even shorter users are able to reach the grip portion.

The retraction device may be used particularly advantageously to prevent trapping of the pulling element and/or the grip portion when the tailgate is closed. In this case, the retraction device is preferably designed to pull up the grip portion to the starting region until it is arranged closer to the starting region than a lower edge of the tailgate. In this case, the edge of the tailgate opposing the pivot axis is denoted as the lower edge, even when this lower edge, for example, forms the uppermost part of the tailgate when the tailgate is opened wide. Moreover, the retraction device is preferably designed to extend the grip portion relative to the starting region until it is spaced further apart from the starting region than the lower edge. In other words, in the closed position the spacing between the grip portion and the starting region is smaller than the spacing between the starting region and the lower edge so that irrespective of the alignment of the pulling element, trapping is impossible. This also expressly includes the possibility that the grip portion is arranged immediately adjacent to the starting region. In the open position, however, when trapping is impossible per se, the spacing between the grip portion and the starting region may be larger than the spacing between the starting region and the lower edge. In this state, the pulling element normally hangs down approximately vertically from the starting region and it is advantageous if it reaches down as far as possible in order to be easily reachable even for a shorter user.

It is expedient to arrange a part of the pulling element which does not extend downwardly from the starting region in a space-saving manner. One possibility thereof is to wind up and/or roll up this part of the pulling element. According to an advantageous variant, therefore, the retraction device comprises a rotatably mounted roller element for at least partially rolling up the pulling element. The roller element is rotatably mounted and receives a part of the pulling element which is rolled up and/or wound up onto the roller element. Normally, the roller element is configured as a roller or spool with a round cross section, but it could also, for example, have a polygonal or oval cross section. Preferably, the roller element is entirely arranged on and/or in the tailgate. In this case, it is rotatably mounted on and/or in the tailgate.

The pulling element is flexible as a whole, which includes the possibility that it consists of a plurality of elements which are movably connected together and which per se consist of non-flexible material, i.e. for example in the manner of a chain which has links made of metal, plastics or a different suitable material. According to a preferred embodiment, the pulling element is configured from flexible material. This flexible material may, for example, be a woven fabric made of natural fibers and/or synthetic fibers, leather and/or artificial leather, a sufficiently flexible plastics material, an elastomer, or the like. Naturally, combinations of the aforementioned materials may also be used. The pulling element may in this case be configured as a cord or as a strap.

Preferably, a handle for the user is arranged in the grip portion. Such a handle serves to produce a positive connection with the hand of the user in the pulling direction. In this case it may be a loop, for example, which is configured from the material of the pulling element. For example, when the pulling element is configured as a flexible strap, an end region could be folded back and stitched in the manner of a loop. Alternatively, the handle, for example, could be a knob made of a non-flexible material. It could also be a handle which, for example, is configured in the shape of an eye so that the user is able to reach therein with the hand. A handle could also be configured to be substantially rod-shaped and connected to the pulling element in the center thereof, so that overall a "T"-like structure is produced.

The functions of the retraction device may be implemented in different ways. According to one embodiment, the retraction device comprises an actuator unit for moving the pulling element, said actuator unit being coupled to a sensor unit for detecting a position of the tailgate. The sensor unit in this case may be arranged entirely within the tailgate and, for example, detect the position thereof by a gravity sensor. If the vehicle is located entirely on an oblique plane, this could falsify the measurement, but only to a minimal extent which in some circumstances is acceptable. Alternatively, the sensor unit could be arranged, for example, on a hinge which connects the tailgate to the vehicle body. The position of the tailgate may be deduced by a measurement of the rotational angle of the hinge. Generally, the sensor unit may comprise not just one but also a plurality of sensors. Optionally, the actuator unit is not directly coupled to the sensor unit but via a control unit which, as a function of sensor signals of the sensor unit, generates control signals for the actuator unit. Naturally, such a control unit may be partially implemented by software. Since the connection between the position of the tailgate, on the one hand, and the designated position of the pulling element, on the other hand, is generally simple (optionally even linear), the control unit may be designed in a simple manner. The actuator unit may comprise one or more actuators which, for example, may be operated electrically, pneumatically or hydraulically. The respective actuator may perform a linear movement, for example as a lifting cylinder which pulls the pulling element, or a rotational movement in order to drive, for example, a roller element described above. Naturally, the drive movement of the actuator unit may be transmitted by suitable gear elements, for example, in order to achieve a deflection of the movement or a gearing-down and/or a gearing-up.

According to a further embodiment, a force which acts between the tailgate and a vehicle structure, when the tailgate is moved, is able to be transmitted by a force transmission mechanism to the retraction device in order to drive this retraction device. If the user moves, i.e. opens or closes, the tailgate, a force (and a torque) acts between the tailgate and the vehicle structure. It could also be said that the force acts on the tailgate relative to the vehicle structure and effects the movement thereof. This force may be used as part of the drive of the retraction device if it is transmitted via a suitable force transmission mechanism. This force transmission mechanism may have very different elements for the force transmission, force deflection, gearing-down or gearing-up, for example gearwheels, toothed rods, drive belts, toothed belts, shafts or the like. In addition to a purely mechanical force transmission, however, for example a hydraulic or pneumatic force transmission might also be conceivable.

Preferably, a force is able to be transmitted from a hinge region of the tailgate to the retraction device by the force transmission mechanism in order to drive the retraction device when the tailgate is moved. In the hinge region, the tailgate is pivotably connected to the vehicle structure (more specifically the vehicle body). If, for example, the retraction device comprises a roller element, this roller element may be mounted coaxially with a first gearwheel which is coupled to a second gearwheel in the hinge region via a toothed belt which extends inside the tailgate. This second gearwheel in turn may cooperate via a transmission gearing with a gearwheel which is held fixedly in terms of rotation relative to the vehicle body. The transmission gearing in this case may have a variable number of gearwheels. When the tailgate is pivoted, the cooperation of the stationary gearwheel with the transmission gearing generates a movement thereof, wherein a multiplication of the revolutions may be achieved in the region of the second gearwheel by means of the gearing-up, which in turn leads to a corresponding number of revolutions of the roller element.

BRIEF DESCRIPTION OF THE DRAWING FIGURES

Further advantageous details and effects of the tailgate subassembly are described in more detail hereinafter with reference to different exemplary embodiments shown in the figures, in which.

DETAILED DESCRIPTION

The same parts are always provided with the same reference numerals in the various figures, which is why generally these parts are only described once.

Figure 1:
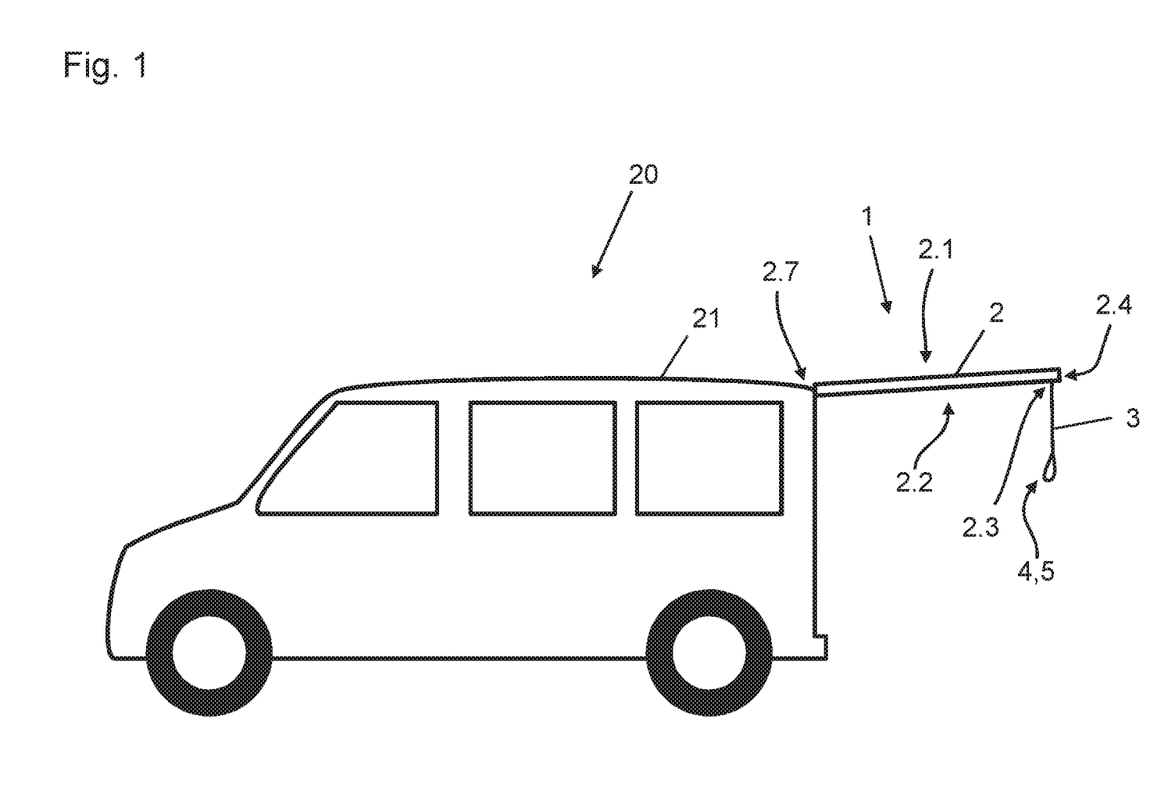
FIG. 1 shows a motor vehicle with a first embodiment of a tailgate subassembly.

FIG. 1 shows schematically a vehicle 20, for example a minivan, with a vehicle structure 21 and a tailgate 2 pivotably connected thereto. The tailgate 2 in the known manner is pivotably connected to the vehicle structure 21 in a hinge region 2.7 about an axis extending in the direction of the vehicle transverse axis. FIG. 1 shows the tailgate 2 in an open position in which a pulling strap 3 hangs down vertically from a starting region 2.3 in the vicinity of a lower edge 2.4 of the tailgate 2. The starting region 2.3 is arranged on an inner face 2.2 of the tailgate which in the closed state faces the interior of the motor vehicle 20 and opposes an outer face 2.1. On the end side of the flexible pulling strap 3 which, for example, may be formed from synthetic fiber fabric, a grip region 4 for a user (not shown) is configured, in which the pulling strap 3 has a loop 5. The loop may be located, for example, at a height of 1.6 m above the ground, whilst the lower edge 2.4 of the tailgate 2 is located, for example, at a height of 2.1 m. By grasping the loop 5 even a shorter user may easily exert a force via the pulling strap 3 onto the tailgate 2 in order to pull said tailgate down and to close it.

Figure 2:
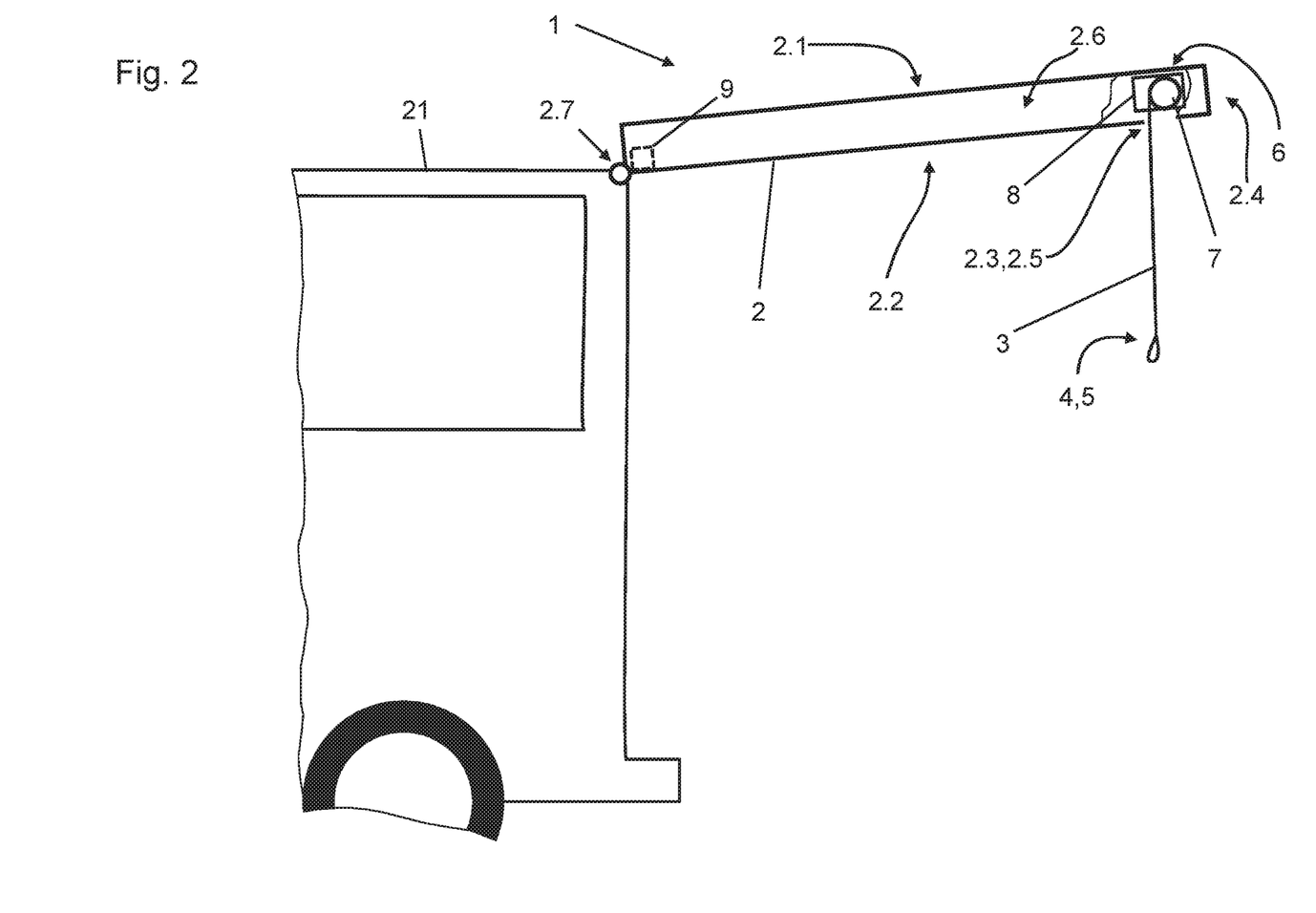
FIGS. 2-4 show a partial view of the vehicle of FIG. 1 in different stages of a closing process of a tailgate.

FIG. 2 is a partial sectional view of a part of FIG. 1. In this case it may be identified that the pulling strap 3 is connected to a spool 7 which is arranged behind an opening 2.5 in an interior 2.6 of the tailgate 2. The pulling strap 3 in this case may be wound onto the spool 7 when this spool is set in rotation via an electric motor 8. The spool 7, the electric motor 8 and an angle sensor 9 in this case form parts of a retraction device 6. The angle sensor 9 is arranged in the hinge region 2.7 and is able to measure the relative position of the tailgate 2 relative to the vehicle structure 21. The angle sensor 9 is coupled (for example via a control unit, not shown) to the electric motor 8, whereby the operation thereof is controlled according to the measured values of the angle sensor.

Whilst it is advantageous in the open position of the tailgate 2 that the pulling strap 3 hangs down as far as possible from the tailgate 2, this may be associated with drawbacks when closing the tailgate 2. Thus, for example, the pulling strap 3 may be trapped between the lower edge 2.4 and the vehicle structure 21. Moreover, during the journey it could arise that parts of the load trap the pulling strap 3 which might be associated with the risk, when the tailgate 2 is opened again, that either part of the load is entrained by the pulling strap 3 or the pulling strap 2 itself tears. For these reasons the retraction device 6 is designed to pull up the grip portion 4 to the starting region 2.3 when the tailgate 2 is moved into a closed position (shown in FIG. 4).

Figure 3:
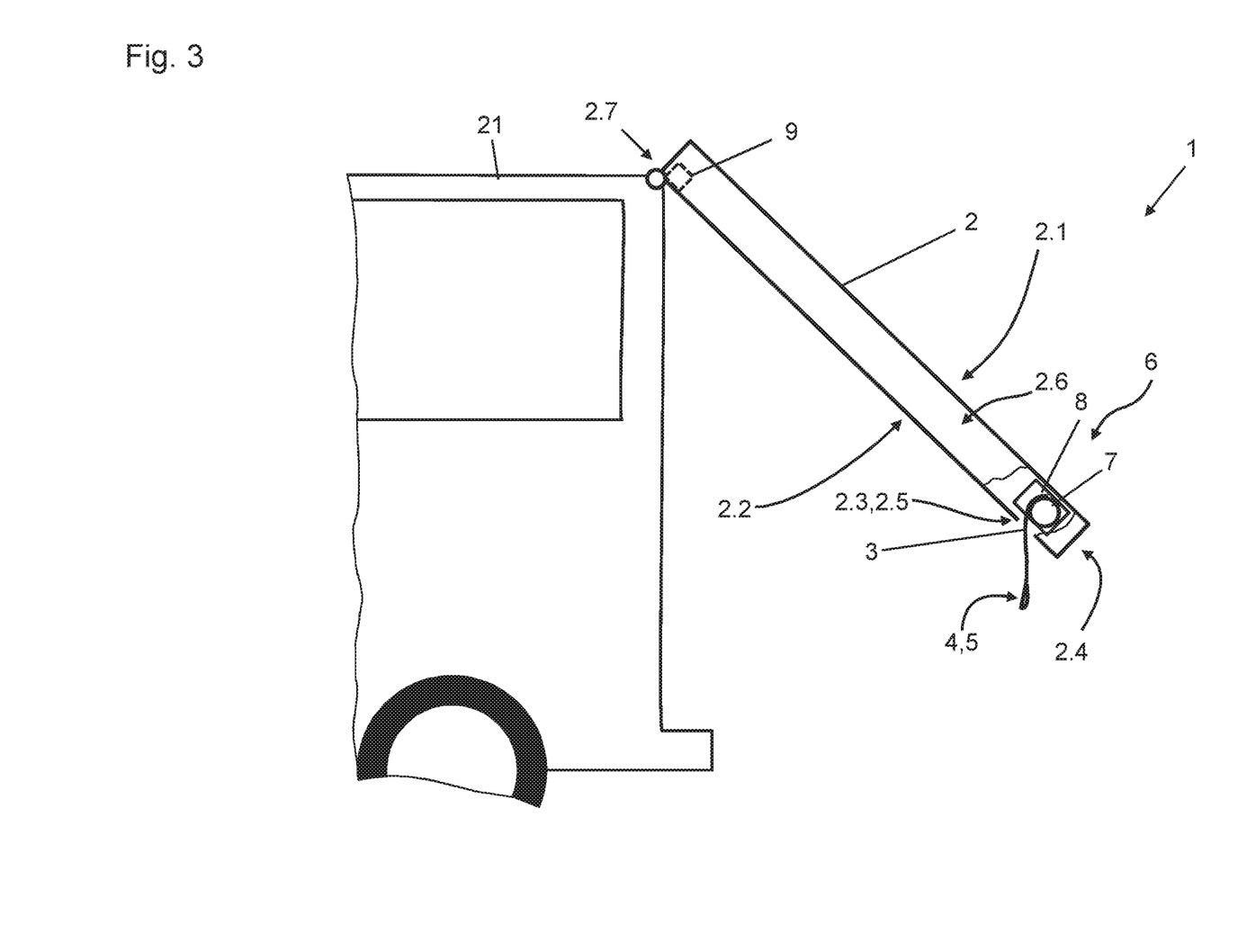

FIG. 3 shows a central position during the closing of the tailgate 2 which in this case approximately adopts an angle of 45° relative to the horizontal. The corresponding angular position is recorded by the angle sensor 9 which results in an activation of the electric motor 8, which sets the spool 7 in rotation. As a result, as indicated in FIG. 3, the pulling strap 3 is rolled up onto the spool 7, i.e. a part of the pulling strap 3 is retracted into the interior 2.6 of the tailgate 2. In FIGS. 2 and 3 the spacing of the grip portion 4 from the starting region 2.3 is greater than the spacing of the lower edge 2.4 from the starting region. With these spacing ratios the pulling strap 3 could still be trapped.

Figure 4:
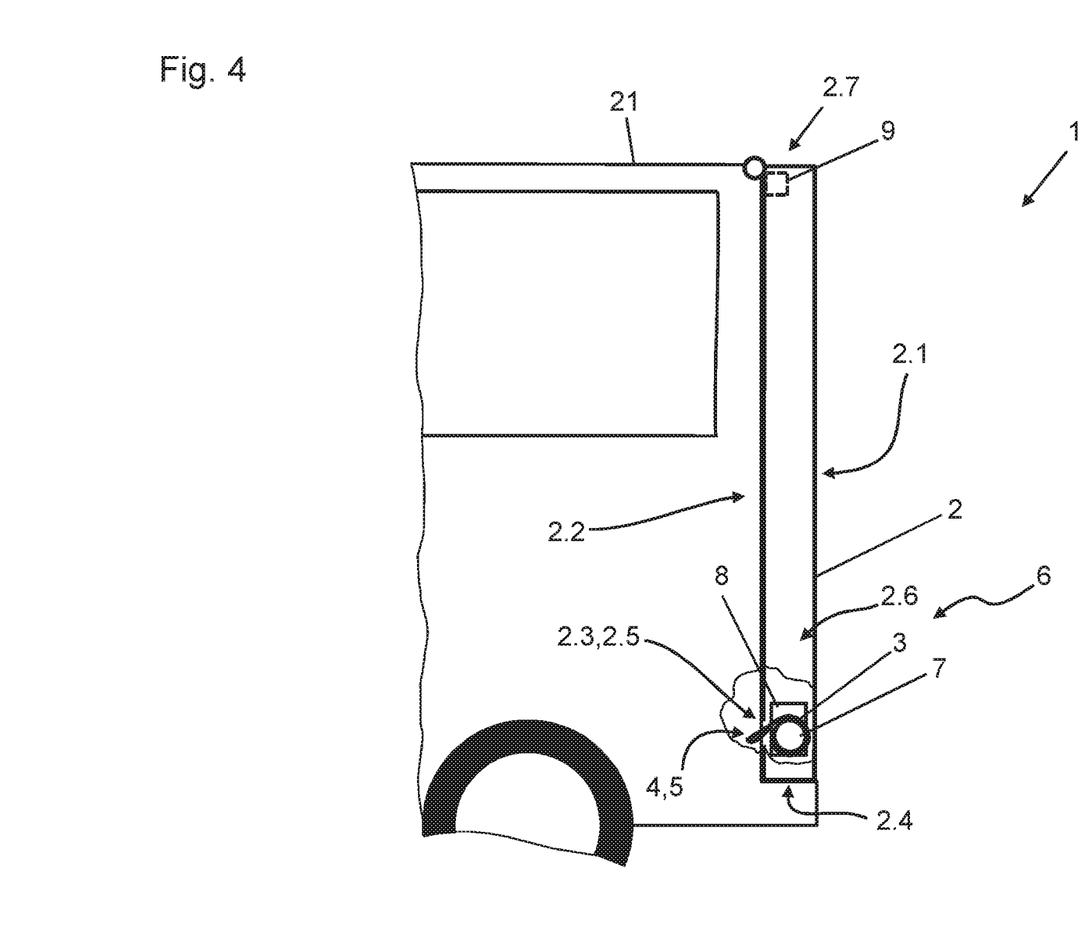

This alters when the tailgate approaches the closed position which is shown in FIG. 4. According to the measured values received by the angle sensor 9, in this case the pulling strap 3 is rolled up onto the spool 7 by the operation of the electric motor 8, so that the grip portion 4 is arranged closer to the starting region 2.3 than the lower edge 2.4. Thus any trapping of the pulling strap 3 and/or the loop 5 is excluded.

When opening the tailgate 2, i.e. when transferring from the closed position into the open position, the current position of the tailgate 2 is again recorded by the angle sensor 9 and the electric motor 8 is correspondingly driven so that it rotates the spool 7 in the reverse direction which results in the grip portion 4 being extended relative to the starting region 2.3. If the tailgate 2 is located in the open position, the pulling strap 3 is lowered again with the grip portion 4 as far as is shown in FIG. 2.

Figure 5:
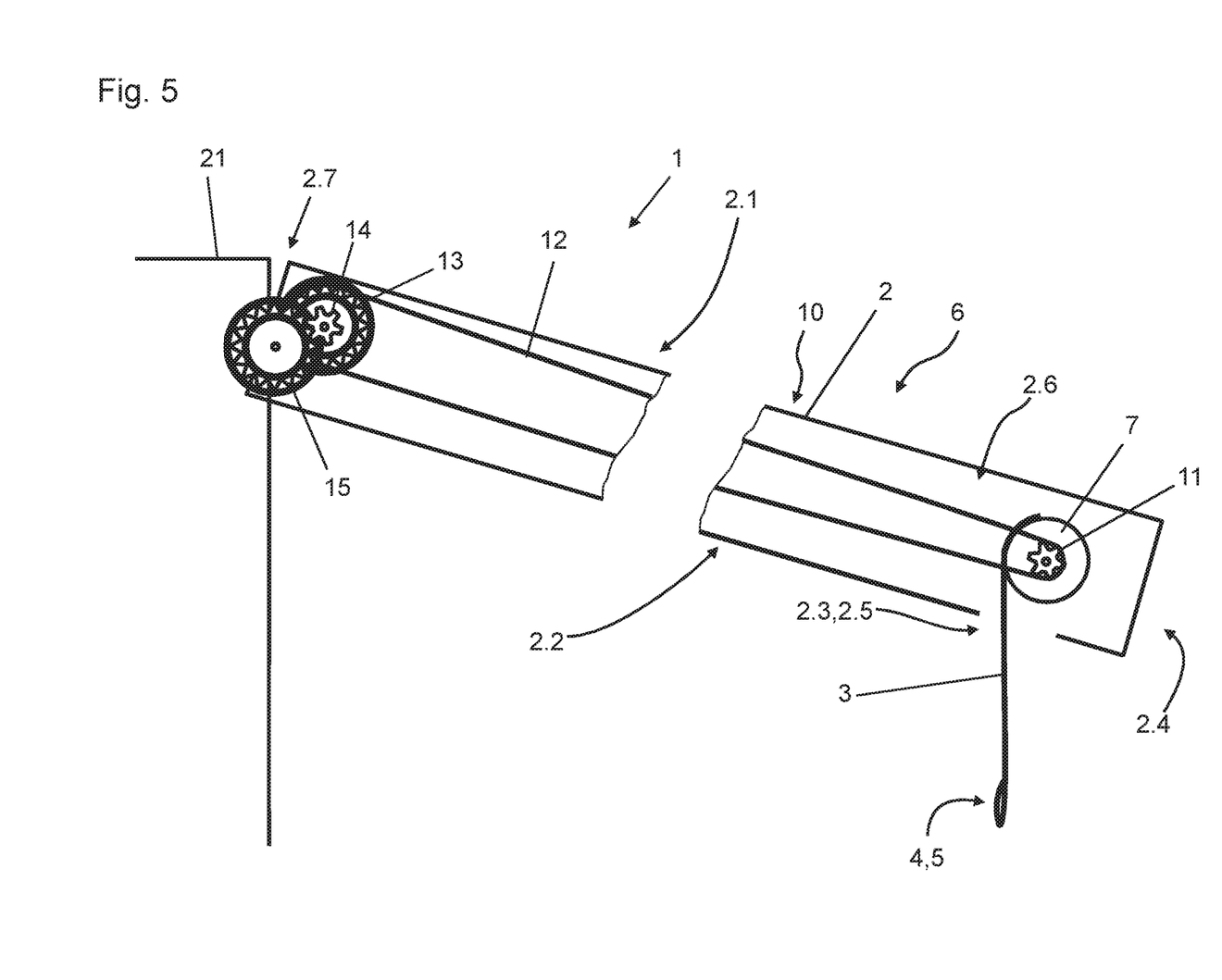
FIG. 5 shows a view of a second embodiment of a tailgate subassembly.

In the embodiment shown in FIGS. 1 to 4, the retraction device 6 is driven by motor. The corresponding energy supply in this case may be provided via the vehicle battery. In FIG. 5 an alternative embodiment of a tailgate subassembly 1 is shown, in which a force acting between the tailgate 2 and the vehicle structure 21 is used in order to operate the retraction device 6. To this end, a force acting in the hinge region 2.7 is transmitted by a force transmission mechanism 10. The individual elements of the tailgate subassembly 1 are not described again if they correspond to the first embodiment. As may be identified in FIG. 5, the spool 7 is connected fixedly in terms of rotation to a coaxial first gearwheel 11 over which a toothed belt 12 extends, said toothed belt extending in the hinge region over a second gearwheel 13. The second gearwheel 13 has a greater number of teeth than the first gearwheel 11 so that a gearing-up is implemented. The second gearwheel 13 in turn is connected fixedly in terms of rotation to a coaxial third gearwheel 14 which also has a smaller number of teeth.

The third gearwheel 14 in turn meshes with a fourth gearwheel 15 which is mounted coaxially to the pivot axis of the tailgate 2, fixedly in terms of rotation to the vehicle structure 21. The fourth gearwheel 15 has a greater number of teeth than the third gearwheel 14 which results, when the tailgate 2 is pivoted, in the third gearwheel 14 performing together with the second gearwheel 13 a rotational movement relative to the tailgate 2. The corresponding rotational movement is transmitted by the toothed belt 12 to the first gearwheel 11, wherein by the gearing-up between the second gearwheel 13 and the first gearwheel 11 a larger rotational angle of the first gearwheel 11 and thus of the spool 7 is produced. If in the view of FIG. 5 the tailgate 2 is opened, i.e. moved counterclockwise, the third gearwheel 14 also rotates relative to the tailgate 2 counterclockwise. The same applies to the second gearwheel 13, the first gearwheel 11 and the spool 7 which thus discharges the pulling strap 3 with the grip portion 4. When the tailgate 2 is closed, a reversal of the movement occurs which leads to a retraction of the pulling strap 3.

What is claimed:

1. A tailgate subassembly for a vehicle comprising:
a tailgate; and
an elongated pulling element which in an open position of the tailgate extends downwardly at least partially from a starting region on an inner face of the tailgate, said elongated pulling element having a grip portion for a user;
characterized in that the elongated pulling element is coupled to a retraction device, said retraction device including an actuator unit that (a) moves the elongated pulling element and (b) is coupled to a sensor unit that detects an angular position of the tailgate whereby the retraction device is configured to pull up the grip portion in a direction of the starting region when the tailgate is moved into a closed position and wherein a force which acts between the tailgate and a vehicle structure, when the tailgate is moved, is able to be transmitted by a force transmission mechanism to the retraction device in order to drive the retraction device.

2. The tailgate subassembly as claimed in claim 1, wherein the force is able to be transmitted from a hinge region of the tailgate to the retraction device by the force transmission mechanism in order to drive the retraction device when the tailgate is moved.

3. The tailgate subassembly as claimed in claim 1, wherein the retraction device is designed to extend the grip portion relative to the starting region when the tailgate is moved into the open position.

4. The tailgate subassembly as claimed in claim 3, wherein the retraction device is adapted to pull up the grip portion to the starting region until the grip portion is arranged closer to the starting region than a lower edge of the tailgate and to extend the grip portion relative to the starting region until the grip portion is spaced further apart from the starting region than the lower edge.

5. The tailgate subassembly as claimed in claim 1, wherein the retraction device comprises a rotatably mounted roller element for at least partially rolling up the elongated pulling element.

6. The tailgate subassembly as claimed in claim 5, wherein the elongated pulling element is configured from flexible material.

7. The tailgate subassembly as claimed in claim 6, wherein a handle for the user is arranged in the grip portion.

8. A tailgate subassembly for a vehicle comprising:
a tailgate; and
an elongated pulling element which in an open position of the tailgate extends downwardly at least partially from a starting region on an inner face of the tailgate, said elongated pulling element having a grip portion for a user;
characterized in that the elongated pulling element is coupled to a retraction device, said retraction device including an actuator unit that moves the elongated pulling element and is coupled to a sensor unit that detects an angular position of the tailgate whereby the retraction device is configured to pull up the grip portion in a direction of the starting region when the tailgate is moved into a closed position wherein (a) the retraction device is designed to retract the elongated pulling element at least partially into an interior of the tailgate, (b) the retraction device is designed to extend the grip portion relative to the starting region when the tailgate is moved into the open position, (c) the retraction device is adapted to pull the grip portion toward the starting region until the grip portion is arranged closer to the starting region than a lower edge of the tailgate and to extend the grip portion relative to the starting region until the grip portion is spaced further apart from the starting region than the lower edge, (d) the retraction device comprises a rotatably mounted roller element for at least partially rolling up the elongated pulling element, (e) the elongated pulling element is configured from flexible material, (f) a handle for the user is arranged in the grip portion and (g) a force which acts between the tailgate and a vehicle structure, when the tailgate is moved, is able to be transmitted by a force transmission mechanism to the retraction device in order to drive the retraction device.

\* \* \* \* \*